United States Patent
Cheng et al.

(10) Patent No.: US 11,295,014 B2
(45) Date of Patent: Apr. 5, 2022

(54) TPM-BASED SECURE MULTIPARTY COMPUTING SYSTEM USING A NON-BYPASSABLE GATEWAY

(71) Applicant: Baidu USA LLC, Sunnyvale, CA (US)

(72) Inventors: Yueqiang Cheng, Sunnyvale, CA (US); Tongxin Li, Sunnyvale, CA (US); Yulong Zhang, Sunnyvale, CA (US); Tao Wei, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 379 days.

(21) Appl. No.: 16/406,797

(22) Filed: May 8, 2019

(65) Prior Publication Data
US 2020/0356670 A1 Nov. 12, 2020

(51) Int. Cl.
*G06F 21/56* (2013.01)
*H04L 29/06* (2006.01)

(52) U.S. Cl.
CPC .......... *G06F 21/566* (2013.01); *G06F 21/567* (2013.01); *H04L 63/062* (2013.01); *H04L 63/1416* (2013.01)

(58) Field of Classification Search
USPC .......................................................... 726/24
See application file for complete search history.

(56) References Cited

U.S. PATENT DOCUMENTS

| 2005/0188087 A1* | 8/2005 | Iyoda ............... G06F 9/505 709/226 |
| 2006/0233166 A1* | 10/2006 | Bou-Diab ............ H04L 63/08 370/389 |
| 2013/0117804 A1* | 5/2013 | Chawla ............. G06F 21/53 726/1 |
| 2014/0051432 A1* | 2/2014 | Gupta ............... G06F 21/57 455/425 |

(Continued)

FOREIGN PATENT DOCUMENTS

| GN | 109101822 A | 12/2018 |
| JP | 2004151886 A | 5/2004 |

(Continued)

OTHER PUBLICATIONS

Kung-Kiu, "Service-Oriented and Cloud Computing", Sep. 11-13, 2013, Second European Conference, ESOCC 2013, Springer, 104-118 (Year: 2013).*

*Primary Examiner* — Sakinah White Taylor
(74) *Attorney, Agent, or Firm* — Womble Bond Dickinson (US) LLP

(57) ABSTRACT

Embodiments of the disclosure disclose a system to prevent data of a client from leaking to untrusted parties in a multiparty computation environment. According to one embodiment, in response to a request received at a gateway (e.g., a non-bypassable gateway) of a server from a user device of a user over a network to process user data by an execution service, the system sanitizes the user data by scanning the user data for malicious code. The system (Continued)

selects a trusted execution environment (TEE) worker from a number of TEE workers and initiates an execution of the execution service by the selected TEE worker. The system receives execution results from the selected TEE worker. The system transmits the execution results to the user device of the user over the network.

17 Claims, 9 Drawing Sheets

(56) References Cited

U.S. PATENT DOCUMENTS

| | | | |
|---|---|---|---|
| 2014/0208123 | A1 | 7/2014 | Roth et al. |
| 2014/0317686 | A1 | 10/2014 | Vetillard |
| 2016/0253651 | A1* | 9/2016 | Park .................. G07F 9/023 705/39 |
| 2017/0180314 | A1* | 6/2017 | Walker ............... H04L 9/083 |
| 2017/0195256 | A1* | 7/2017 | Javali ............... H04L 61/2557 |
| 2018/0114012 | A1* | 4/2018 | Sood .................. G06F 21/53 |
| 2018/0232517 | A1* | 8/2018 | Roth .................. H04L 63/10 |
| 2018/0373885 | A1* | 12/2018 | Arad .................. G06F 21/629 |
| 2019/0074980 | A1* | 3/2019 | Loreskar ............. G06F 21/57 |
| 2019/0199745 | A1* | 6/2019 | Jakobsson ........... H04L 63/1433 |

FOREIGN PATENT DOCUMENTS

| | | |
|---|---|---|
| JP | 2010020728 A | 1/2010 |
| JP | 2011114799 A | 6/2011 |
| JP | 2016099837 A | 5/2016 |
| JP | 2019016281 A | 1/2019 |
| KR | 20150106935 A | 9/2015 |
| KR | 20190032276 A | 3/2019 |

\* cited by examiner

TPM-BASED SECURE MULTIPARTY COMPUTING SYSTEM USING A NON-BYPASSABLE GATEWAY

TECHNICAL FIELD

Embodiments of the invention relate generally to secure multiparty computing. More particularly, embodiments of the invention relate to a trusted platform module (TPM)-based secure multiparty computing system using a non-bypassable gateway.

BACKGROUND

Sensitive transactions are increasingly being performed by cloud based servers. Cloud-based is a term that refers to applications, services or resources made available to users on demand via the Internet from cloud servers. The multiparty or multitenant nature of cloud based servers has an increasing need for securing a multitenant computing environment from unauthorized accesses by untrusted parties. For example, during computation, data from one party may be accessible by untrusted parties. Thus, there is a need to secure data during computation. Furthermore, cryptographic based multiparty computation solutions are slow and thus may not be practical.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure disclose a system to prevent data of a client from leaking to untrusted parties in a multiparty computation environment. According to one embodiment, in response to a request received at a gateway (e.g., a non-bypassable gateway) of a server from a user device of a user over a network to process user data by an execution service, the system sanitizes the user data by scanning the user data for malicious code. The system selects a trusted execution environment (TEE) worker from a number of TEE workers and initiates an execution of the execution service by the selected TEE worker. The system receives execution results from the selected TEE worker. The system transmits the execution results to the user device of the user.

Figure 1:
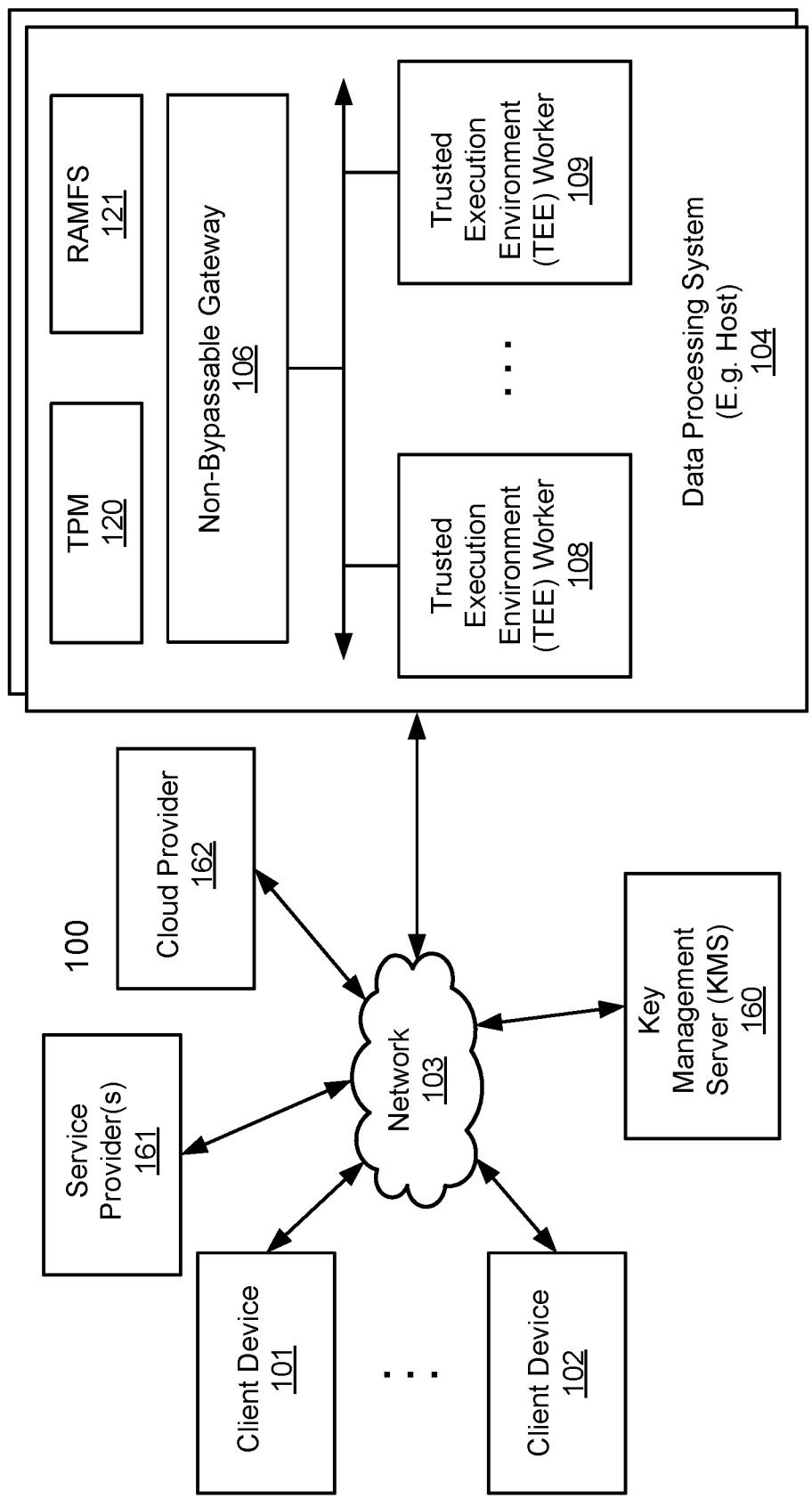
FIG. 1 is a block diagram illustrating an example of system configuration for a computing system for secure multiparty computation using a non-bypassable gateway according to one embodiment.

FIG. 1 is a block diagram illustrating an example of system configuration for a computing system for secure multiparty computation using a non-bypassable gateway according to one embodiment. Referring to FIG. 1, system configuration 100 includes, but is not limited to, one or more client devices 101-102 communicatively coupled to data processing server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless. The communication between client devices 101-102, data processing server 104, and management services server 160 over network 103 can be secured, e.g., via TLS/SSL.

Data processing server (e.g., host) 104 may be any kind of servers or a cluster of servers, such as Web or cloud servers, application servers, backend servers, or a combination thereof. Server 104 can include an interface to allow a client such as client devices 101-102 to access resources or services provided by server 104, key management server 160, services provider 161, or cloud operator 162. For example, server 104 may be a cloud server or a server of a data center operated by cloud operator 162. Server 104 can provide a variety of cloud services to clients, such as, for example, cloud storage, cloud computing services, big data services, modeling services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

Data processing server 104 can include RAM disk file system (ramfs) 121 and one or more CPU(s) (not shown) equipped with a security module, such as a trusted platform module (TPM) 120, for secure boot. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot for server 104 so an operating system or an execution environment (e.g., TEE workers 108-109) of server 104 can be trusted.

Data processing server 104 can include non-bypassable gateway 106 (e.g., gateway) and one or more trusted execution environments 108-109. Non-bypassable gateway 106 can be a trusted gateway that mediates all network traffics, including data traffic and access control traffic between clients 101-102 and TEE workers 108-109, KMS 160 and TEE worker 108-109, and service provider 161 and TEE worker 108-109. In addition, gateway 106 can enforce 4A services (e.g., Authentication, Authorization, Audit, or Account), and can perform code analysis, firewall services, and data sanitization based on the mediated network traffics to mitigate potential exploits.

In one embodiment, gateway 106 can communicate with client devices 101-102 to facilitate client requests. Gateway 106 can launch trusted execution environments, such as environments 108-109, to execute various execution services for different clients and/or client requests. Here, trusted execution environments (TEEs) are sandboxed execution environments which are isolated from each other and from the operating system of server 104. In one embodiment, the TEE can run in parallel with the operating system to ensure confidentiality and integrity for code and data loaded in the TEE. In one embodiment, a TEE can be a runtime container that performs an operating system level virtualization (e.g., Kata container) with standalone kernel, networking, and/or input/output. In another embodiment, a TEE can use both hardware (e.g., TPM) and software (e.g., Intel software guard extension (SGX)) to further protect data and code.

In one embodiment, system 100 includes a cluster of computing server nodes and server 104 is one of the computing server nodes in the cluster. In order to maintain a threshold of reliability and scalability, the cluster may be a reliable, replicated, redundant, and fault-tolerant (RAFT) cluster. Note, RAFT refers to a consensus algorithm that allows a collection of nodes (e.g., including server 104) to work as a coherent group that can survive the failures of some of its node members. For example, gateway 106 of server 104 may execute a RAFT service as part of the RAFT cluster. As part of the RAFT service, gateway 106 can maintain a consistent copy of a state machine and/or a replicated log among the nodes in the cluster so it appears to clients 101-102 that they are interacting with a single, reliable machine, even if a minority of the nodes in the cluster fails. The consistency of a state machine and/or a replicated log among the nodes in the cluster can be maintained by electing a leader node, where the leader node is responsible for state machine/log replication to the follower nodes. The leader regularly informs the followers of its existence by sending a heartbeat message. Each follower has a timeout in which it expects the heartbeat from the leader. The timeout is reset on receiving the heartbeat. If no heartbeat is received the follower changes its status to elect a new leader. Here, a service request from client device 101 can be logged by gateway 106 while a state of the request can be logged in a state machine. The state machine/log can be replicated among the server nodes in the cluster by a chosen leader node. The logged state machine/log can ensure the client request can be serviced by any of the nodes in the cluster in the event server 104 subsequently becomes inoperable.

In one embodiment, gateway 106 can communicate with key management server (KMS) 160 to obtain cryptographic keys. KMS 160 may be any kind of server. Server 160 can include an interface (e.g., API or CLI) to allow data processing server 104 to access key management services provided by server 160, such as key generation, authentication/verification, and key retrieval services for asymmetric keys, symmetric keys, and session keys. For example, gateway 106 can request and obtain a dedicated key pair for any of TEE workers 108-109 from KMS 160. Gateway 106 can then provide key services such as requests for cryptographic keys for various entities (e.g., client devices 101-102 and TEE workers 108-109) in communication with gateway 106 and maintain these keys in a protected list within gateway 106. In one embodiment KMS 160 is executed in a secure enclave, such as an Intel SGX enclave. In another embodiment, KMS 160 can ensure TEE workers are trusted by attesting the TEE workers using SGX remote attestation. Although shown as a single server, in some embodiments, key management server 160 may represent many servers, or may be an integrated with data processing server 104.

Service provider 161 may be any kind of server. In one embodiment, gateway 106 can communicate with service provider 161 to obtain execution service binaries representing executors/software executables/codes to execute various services requested by client devices 101-102 without leaking client data to service provider 161. Some execution services can include computing services to scan a code, big data analysis, modeling, machine learning (artificial intelligence) inference/training tasks, etc. Similar to server 160, service provider 161 can include an interface (e.g., API or CLI) to allow data processing server 104 to access the services binaries provided by server 161. Although shown as a single server, in some embodiments, service provider 161 may represent many servers, or may be an integrated with KMS 160 and/or data processing server 104.

Cloud operator 162 can provide cloud operation services to data processing server 104. Such services include management, provisioning and configuration of a cloud network which server 104 may be a part of. Although shown as a single server, in some embodiments, cloud operator 162 may represent many servers, or may be an integrated with KMS 160, services provider 161, and/or data processing server 104.

Figure 2:
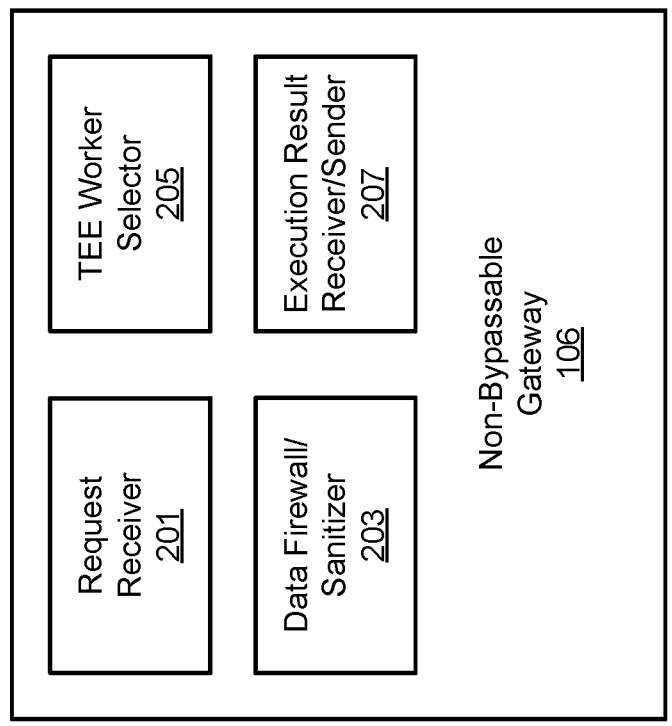
FIG. 2 is a block diagram illustrating an example of a non-bypassable gateway according to one embodiment.

FIG. 2 is a block diagram illustrating an example of a non-bypassable gateway according to one embodiment. Gateway 106 can be dedicated to mediate all network traffic for host server 104 and these network traffic must pass through gateway 106, e.g., gateway 106 is non-bypassable. In one embodiment, gateway 106 includes modules such as request receiver 201, data firewall/sanitizer 203, TEE worker selector/launcher 205, execution results retriever/sender 207. Request receiver 201 can receive a client request from client devices 101-102. The client request can include client data and identifiers/names for execution services to be performed using the client data. Data firewall/sanitizer 203 can scan and sanitize the received client data. The client data can be scanned for, and/or flagged for removal for malicious code, or code that can access, control, or modify a function of server 104. In addition, data firewall/sanitizer 203 can act as a firewall and monitor traffic data for unusual activities to prevent malicious intrusions. TEE worker selector/launcher 205 can select or launch a TEE worker (such as TEE worker 108-109 of FIG. 1) to service the client request. Execution result receiver/sender 207 can receive execution results from the selected TEE worker for the requested execution service and send the execution results to the requesting client devices 101-102.

Figure 3:
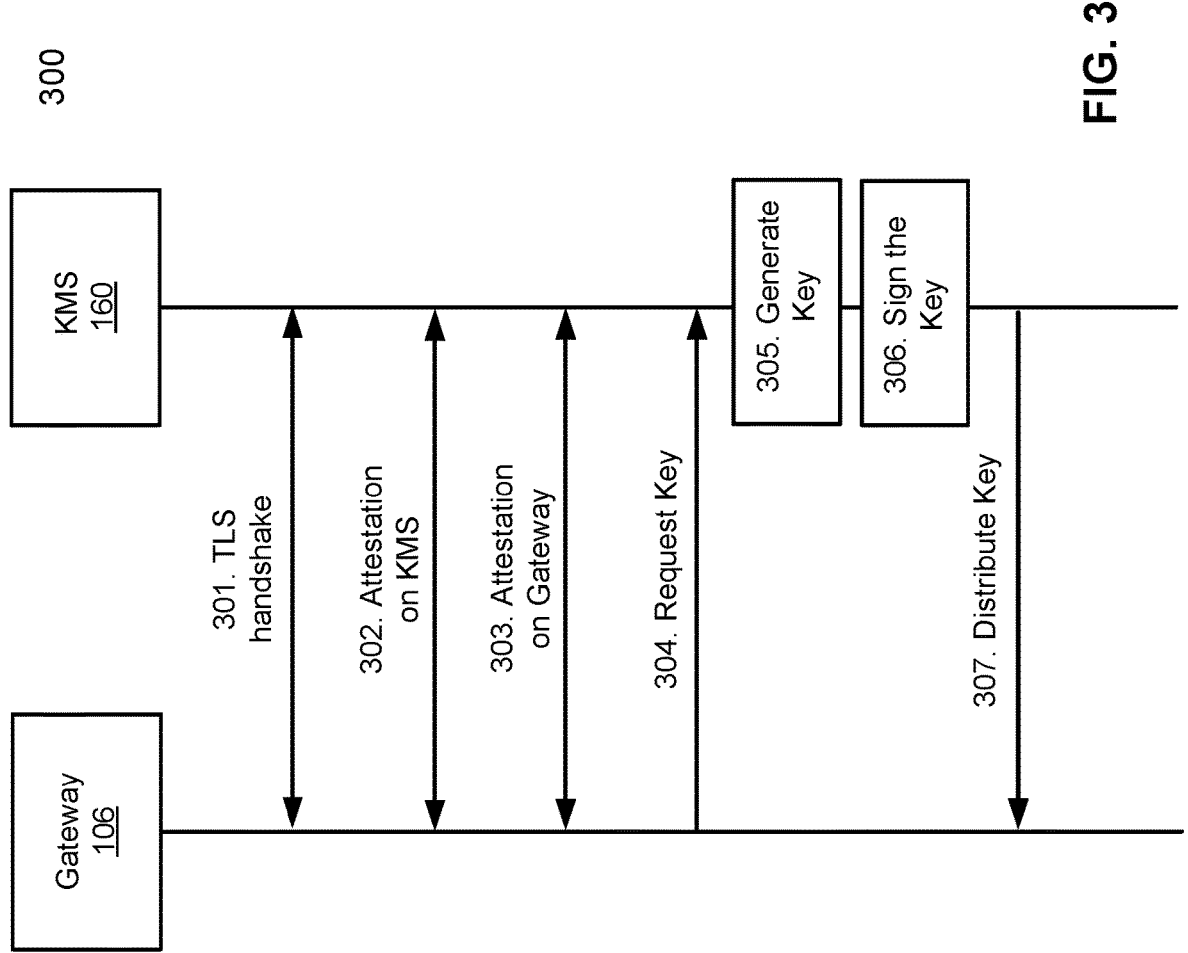
FIG. 3 is a flow chart illustrating an example of a key registration protocol for a secure multiparty computing system according to one embodiment.

FIG. 3 is a flow chart illustrating an example of a key registration protocol for a secure multiparty computing system according to one embodiment. A key registration protocol may be performed by system 100 of FIG. 1. The key registration protocol can be a communication protocol between KMS 160 and a gateway, such as gateway 106 of FIG. 1. Gateway 106 may request a key to encrypt/decrypt a client data, or to associate the key with an entity that needs to authenticate its identity. For example, gateway 106 may request a key to encrypt/decrypt a client data and to save the encrypted client data within RAMFS 121 so the client data can be retrieved at a later time. For entity authentication, examples of entities include, but are not limited to, TEE workers, client devices, and other host servers connected to the network. Referring to FIG. 3, example 300 registers a symmetrical key or an asymmetrical key pair by gateway 106 through KMS 160. In one embodiment, at operation 301, gateway 106 communicates with KMS 160 and performs a TLS handshake for the communication. During a TLS handshake, the two communicating parties (here, gateway 106 and KMS 160) exchange messages to acknowledge/verify each other. The two parties can establish an encryption algorithm and agree on a session key to be used for the communication session.

While gateway 106 may be a secure entity because it is booted with a root of trust using a secure module (e.g., TPM), KMS 160 may not be aware of the secure boot. Similarly, KMS 160 may not be trusted by gateway 106. In one embodiment, at operation 302, gateway 106 performs attestation on KMS 160 to ensure KMS 160 is a trusted entity. Attestation can include TPM key attestation, or various other types of attestation such as attestation from Intel SGX, ARM TrustZone, AMD (secure encrypted virtualization) SEV, etc., depending on the available attestation supported by KMS 160. For example, if KMS 160 is executed in an Intel SGX enclave, the attestation can be an SGX remote attestation. At operation 303, gateway 106 performs attestation on gateway 106 to ensure gateway 106 is a trusted entity. In one embodiment, to increase a scalability of the system, a software-based virtual TPM can be used by any of the entities of FIG. 1, such as gateway 106, KMS 160, or service provider(s) 161, to support multiple hosts or service providers.

At operation 304, gateway 106 requests a key from KMS 160. Here, the key may be a symmetric key or an asymmetric key pair. At operation 305, KMS 160 generates a new key. At operation 306, KMS 160 signs the key, and at operation 307, KMS 160 distributes the signed key to gateway 106. Note that, gateway 106 can record keys in a protected list (e.g., in a protected memory separate from a memory of the operating system), and can identify a particular key issued to a respective client data or entity. Thus, gateway 106 can be seen as providing key generation and maintenance services for server 104. Note that some of the above operations may be optional, such as operations for TLS handshake, attestation, and signing for the key pairs.

Figure 4:
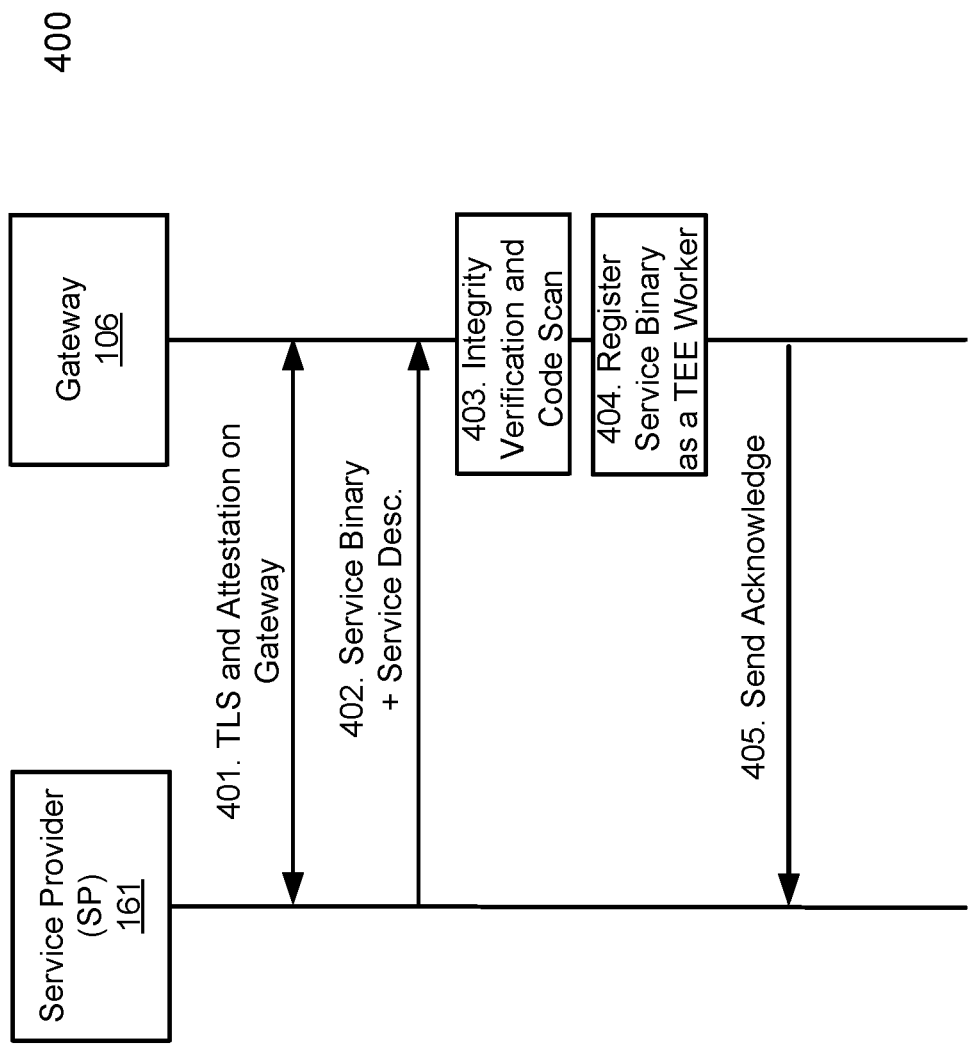
FIG. 4 is a flow chart illustrating an example of an execution service registration protocol for a secure multiparty computing system according to one embodiment.

FIG. 4 is a flow chart illustrating an example of an execution service registration protocol for a secure multiparty computing system according to one embodiment. An execution service registration protocol can be a communication protocol between a service provider (e.g., SP 161 of FIG. 1) and a gateway (e.g., gateway 106 of FIG. 1), for registration of an execution service as a TEE worker so the execution service is available to a client in communication with the gateway. The execution service registration protocol example 400 may be performed by system 100 of FIG. 1. Referring to FIG. 4, in one embodiment, at operation 401, SP 161 performs a TLS handshake and attestation on gateway 106. Similar to the above, the attestation can be TPM-based or any other types of attestations available for gateway 106. At operation 402, SP 161 transmits a service binary with a service description to gateway 106. In one embodiment, the service description includes a signature to verify the service binary. At operation 403, gateway 106 verifies an integrity of the service binary (e.g., the service binary includes all of the expected data packets) and scans the binary for malicious code. For example, gateway 106 may verify a checksum for the service binary. Gateway 106 may further authenticity of the data, e.g., the service binary is associated with SP 161. At operation 404, gateway 106 registers the service binary as a TEE worker (such as TEE worker 108). At operation 405, gateway 106 sends the acknowledgement to SP 161. Note that different execution services can be registered as one or more TEE workers to service client requests. Note that, some of the above operations may be optional, such as operations for TLS handshake and attestation.

Figure 5:
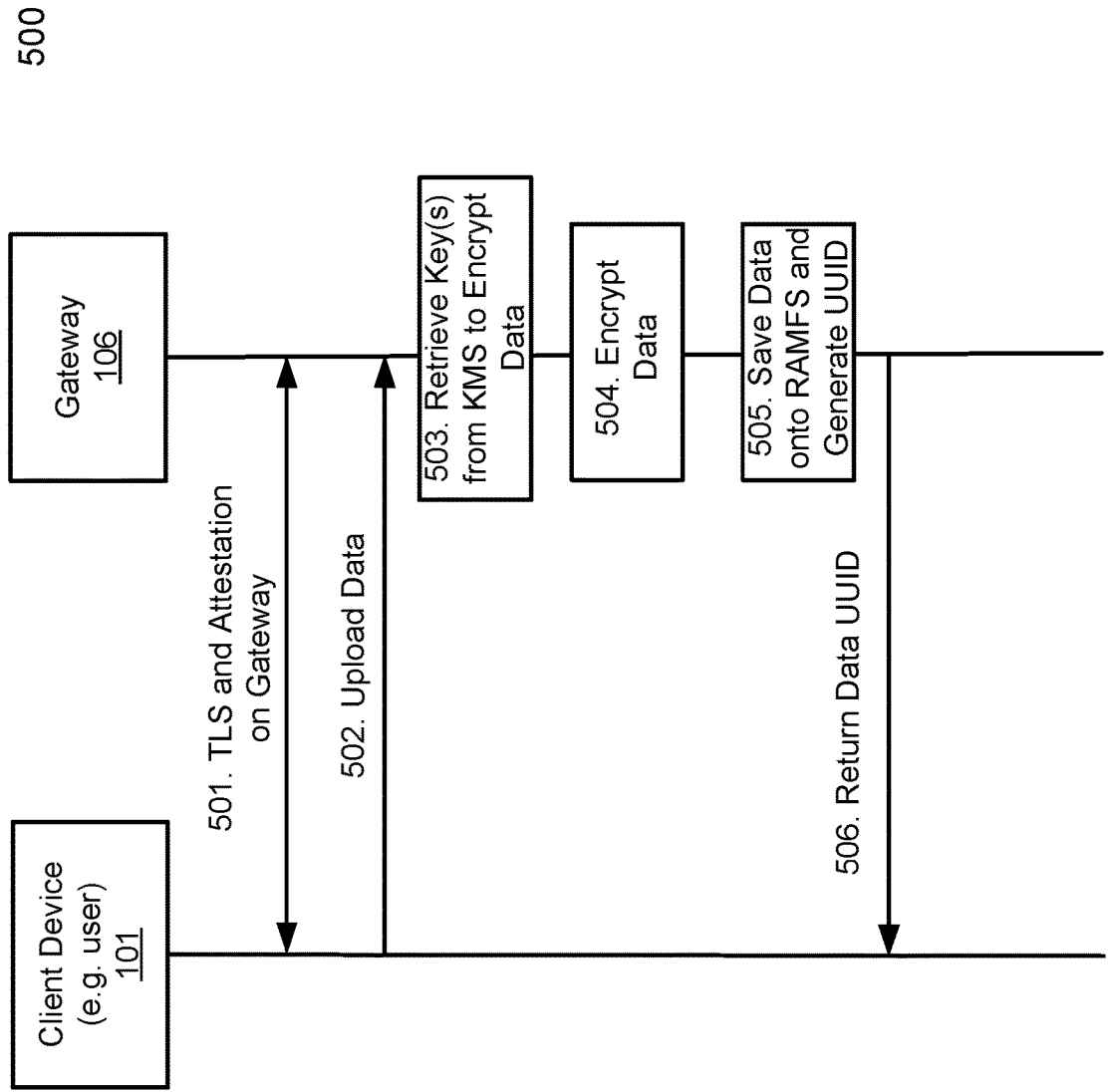
FIG. 5 is a flow chart illustrating an example of a client-gateway data upload protocol according to one embodiment.

FIG. 5 is a flow chart illustrating an example of a client-gateway data upload protocol according to one embodiment. The client-gateway data upload protocol can be a communication protocol between a client (e.g., client device 101-102) and a gateway (gateway 106 of FIG. 1) for the client to upload client data to the gateway. The client-gateway data upload protocol example 500 may be performed by system 100 of FIG. 1. The client data may be uploaded prior to, or at the same time, the client invokes an execution service. Referring to FIG. 5, at operation 501, client 101 performs a TLS handshake and attestation on gateway 106. Similar to the above, the attestation can be TPM-based or any other types of attestations available for gateway 106. At operation 502, client uploads client data to gateway 106. The client data can be an input data to invoke an execution service. At operation 503, gateway 106 retrieves key(s) from a KMS to encrypt the client data. Key(s) can be retrieved by a key registration protocol such as the example shown in FIG. 3. Referring to FIG. 5, at operation 504, gateway 106 encrypts the client data. At operation 505, gateway 106 saves the encrypted client data to RAMFS 121 or any memory system accessible by gateway 106 and generates a universally unique identifier (UUID) for the client data. At operation 505, gateway 106 returns the UUID to client 101. The UUID can then be used by client 101 to subsequently recall the uploaded client data to invoke an execution service.

Figure 6:
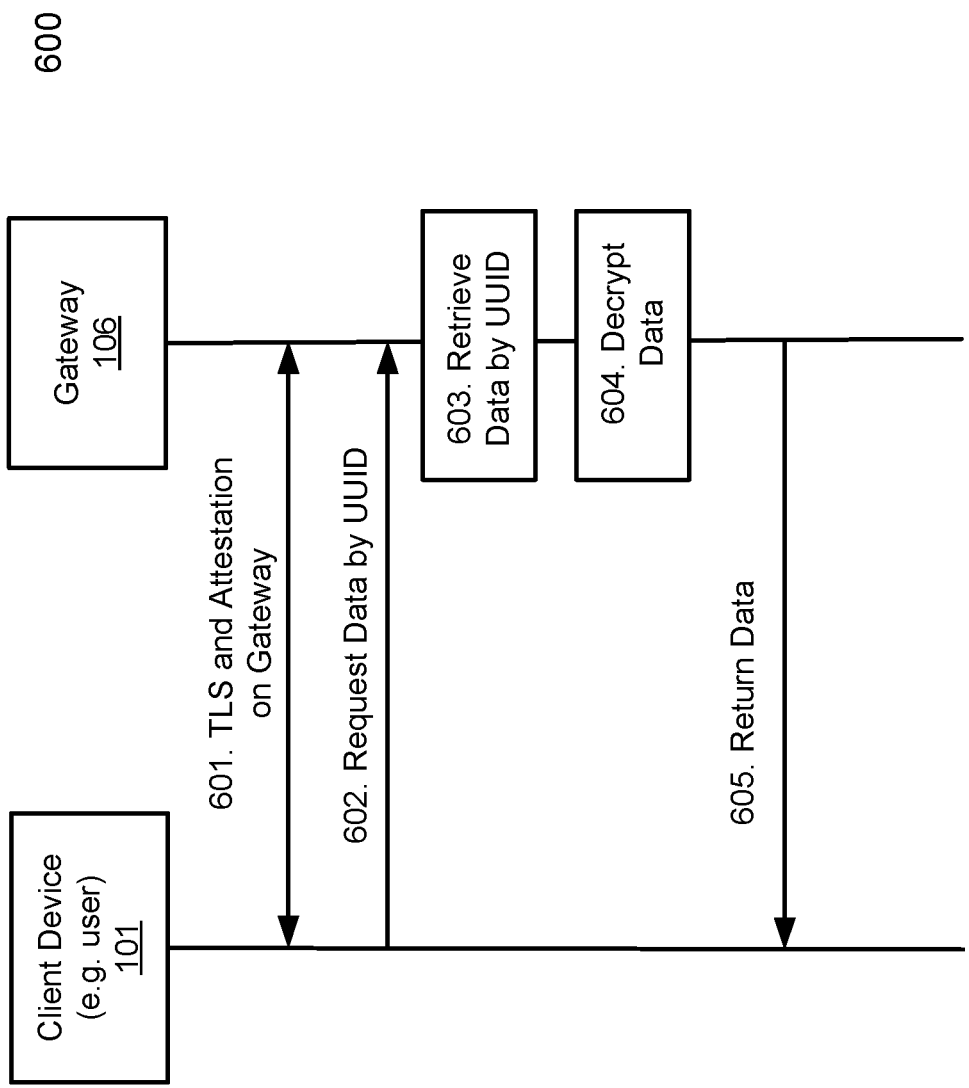
FIG. 6 is a flow chart illustrating an example of a client-gateway data download protocol according to one embodiment.

FIG. 6 is a flow chart illustrating an example of a client-gateway data download protocol according to one embodiment. The client-gateway data download protocol can be a communication protocol between a client (e.g., client device 101-102) and a gateway (gateway 106 of FIG. 1) for the client to download data (e.g., execution results) from the gateway. The client-gateway data download protocol example 600 may be performed by system 100 of FIG. 1. The client may download any data related to the client from gateway 106. Referring to FIG. 6, at operation 601, client 101 performs a TLS handshake and attestation on gateway 106. Similar to the above, the attestation can be TPM-based or any other types of attestations available for gateway 106. At operation 602, client sends a data request by UUID to gateway 106. At operation 603, gateway 106 retrieves the data corresponding to the UUID from RAMFS 121. At operation 604, gateway 106 determines an encryption key associated with the data and decrypts the data. At operation 605, gateway 106 returns the data to client 101.

Figure 7:
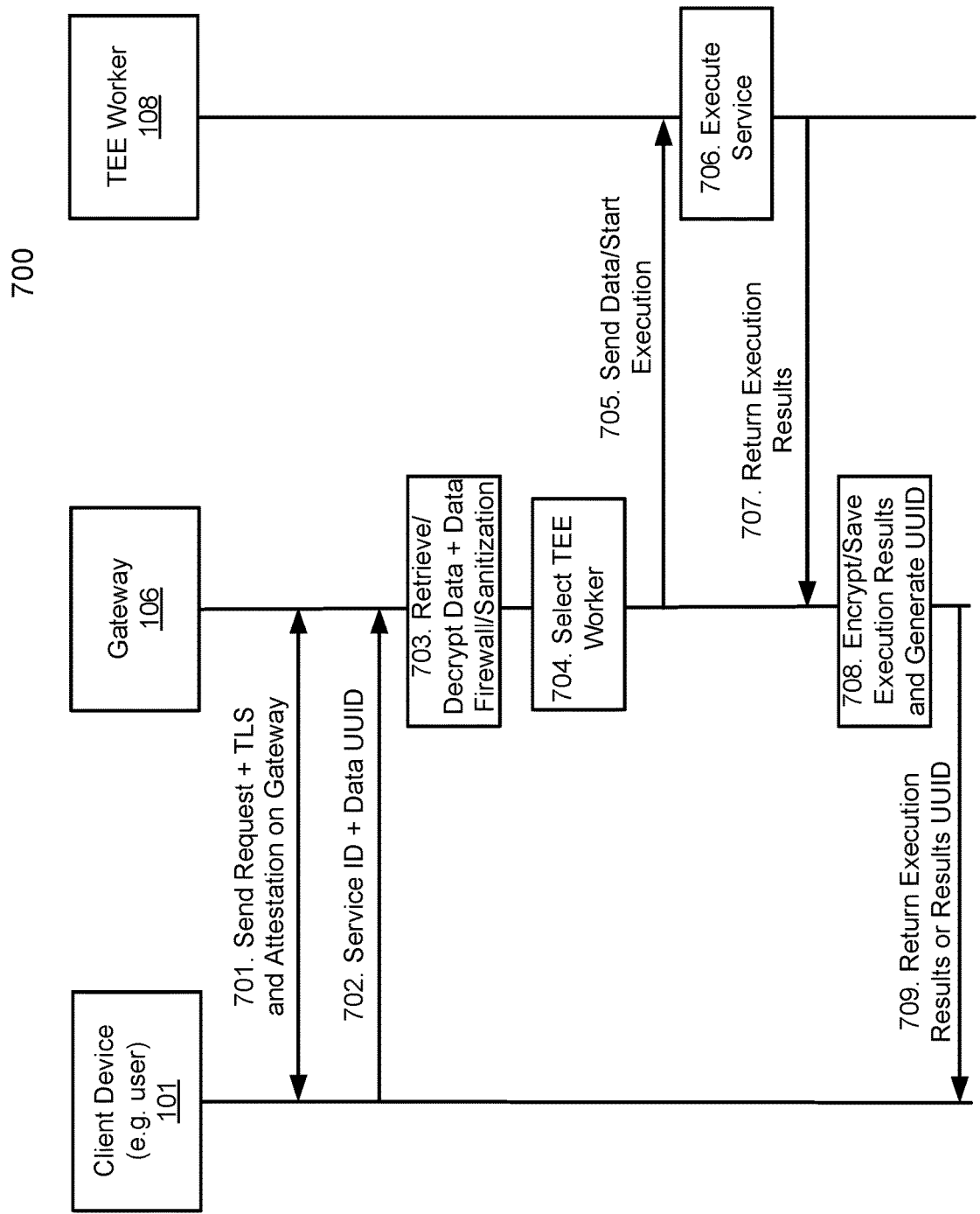
FIG. 7 is a flow chart illustrating an example of an execution service invocation protocol for a secure multiparty computing system according to one embodiment.

FIG. 7 is a flow chart illustrating an example of an execution service invocation protocol for a secure multiparty computing system according to one embodiment. An execution service invocation protocol can be a communication protocol between a client device (e.g., client device 101-102) and a gateway (e.g., gateway 106 of FIG. 1), for invocation of an execution service with the gateway so the execution service can be executed by a TEE worker of the gateway. Execution service invocation protocol example 700 may be performed by system 100 of FIG. 1. Referring to FIG. 7, in one embodiment, at operation 701, client device 101 sends a service request and performs a TLS handshake and attestation on gateway 106. Similar to the above, the attestation can be TPM-based or any other types of attestations available for gateway 106. At operation 702, client device 101 transmits service ID and data UUID to gateway 106. In one embodiment, the service ID includes a unique name or identifier identifying execution service(s) to be executed by server 104. The data UUID can be a UUID identifying client data on RAMFS 121, as the input data, for the execution service(s). At operation 703, gateway 106 retrieves the data from RAMFS 121 using the UUID, decrypts the data, and further sanitizes the data by scanning the data for malicious code. In one embodiment, the input data is directly transmitted by client device 101 to gateway 106 as part of the client request. At operation 704, gateway 106 selects a TEE worker (e.g., TEE worker 108) that is registered for the particular execution service to service the client request. At operation 705, gateway 106 sends the retrieved data to TEE worker 108 and starts the service execution. At operation 706, TEE worker executes the execution service using the data. Upon completion of the execution, at operation 707, TEE worker returns execution results to gateway 106. At operation 708, gateway 106 encrypts and saves a copy of the execution results locally, e.g., on to RAMFS 121. In addition, gateway 106 generates a UUID and associates the UUID to the execution results. At operation 709, gateway 106 returns the execution results or a UUID associated with the execution results to client device 101. Note that the UUID can be mapped to the execution results by a mapping table and the mapping table can be maintained by gateway 106. Note that, some operations may be optional, such as operations for TLS handshake and attestation.

Figure 8:
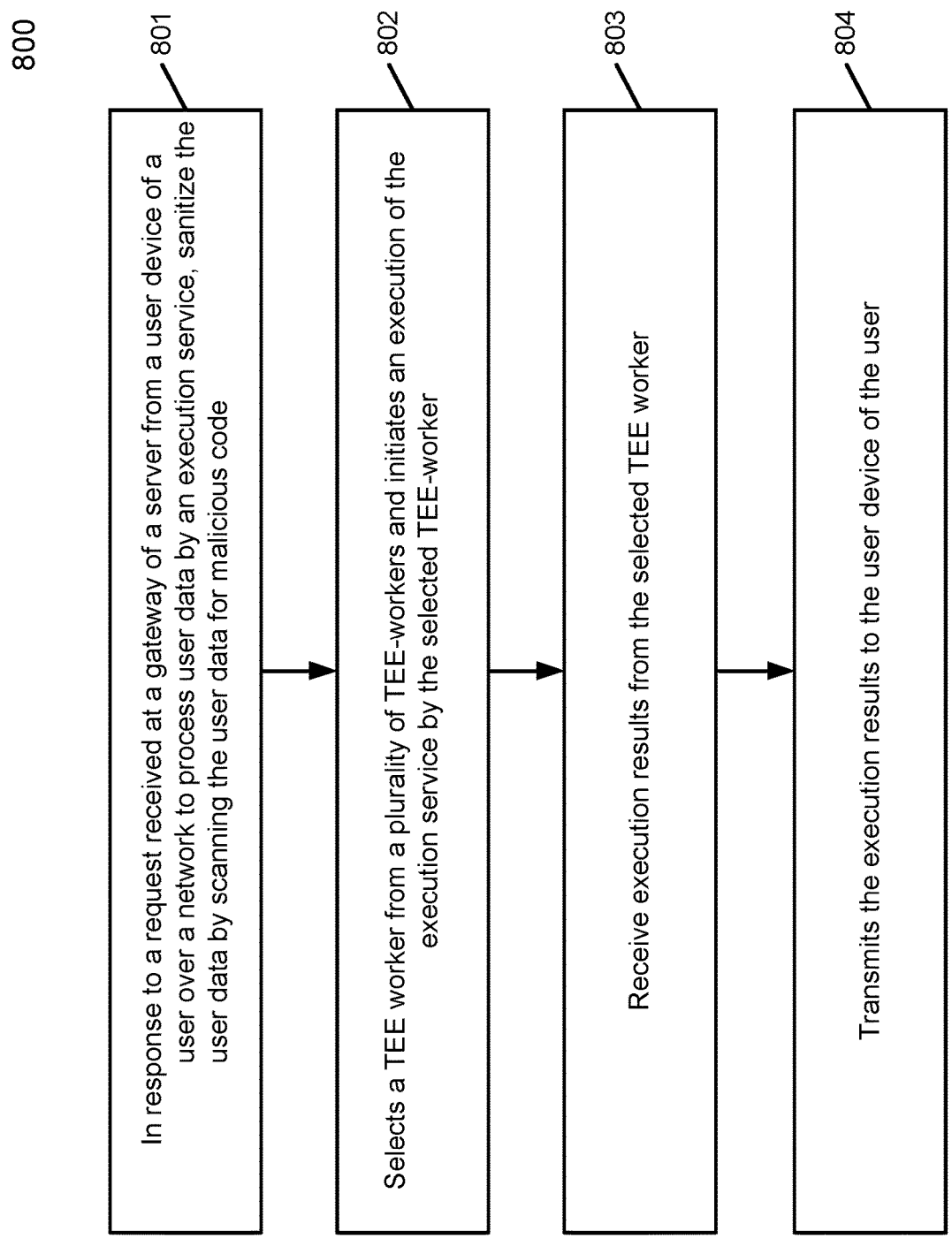
FIG. 8 is a flow diagram illustrating an example of a method according to one embodiment.

FIG. 8 is a flow diagram illustrating an example of a method according to one embodiment. Process 800 may be performed by processing logic which may include software, hardware, or a combination thereof. For example, process 800 may be performed by gateway 106 of data processing server (e.g., host) 104 of FIG. 1. Referring to FIG. 8, at block 801, in response to a request received at a gateway of a server from a user device of a user over a network to process user data by an execution service, processing logic sanitizes the user data by scanning the user data for malicious code. At block 802, processing logic selects a TEE worker from a number of TEE workers and initiates an execution of the execution service by the selected TEE worker. At block 803, processing logic receive execution results from the selected TEE worker. At block 804, processing logic transmits the execution results to the user device of the user.

In one embodiment, the request is one of a number of requests received from a number of user devices associated with a number of users, and where each of the requests is processed within a respective one of a number of TEE workers. In one embodiment, the gateway is attested by the user device to be trusted prior to the user device transmitting the request.

In one embodiment, processing logic further registers the execution service with the gateway prior to invoking the execution service for the client request. In another embodiment, registering the service includes in response to receiving a service binary and a description of the service from a service provider, verifying an integrity and authenticity of the service binary; scanning the service binary for malicious code; and registering the service binary as one of a number of TEE workers. In another embodiment, the service provider attests the gateway to be a trusted prior to the service provider transmitting the service binary to the gateway.

In one embodiment, processing logic further obtains a key to encrypt a client data from a key management server (KMS). In another embodiment, obtaining the public key includes: transmitting by the gateway a request to obtain the key to the KMS; receiving the key from the KMS, where the KMS generated a symmetric key or a key pair, and where the key is signed by the KMS for the gateway to verify authenticity of the key. In another embodiment, processing logic further attests the KMS to be a trusted entity and the KMS attests the gateway to be a trusted entity prior to the gateway transmitting, and the KMS receiving, the request.

In one embodiment, the gateway enforces authentication, authorization, audit, and account for network traffic for the gateway. In one embodiment, the gateway provides reliable, replicated, redundant, and fault-tolerant (RAFT) services. In one embodiment, the gateway is a non-bypassable gateway.

Figure 9:
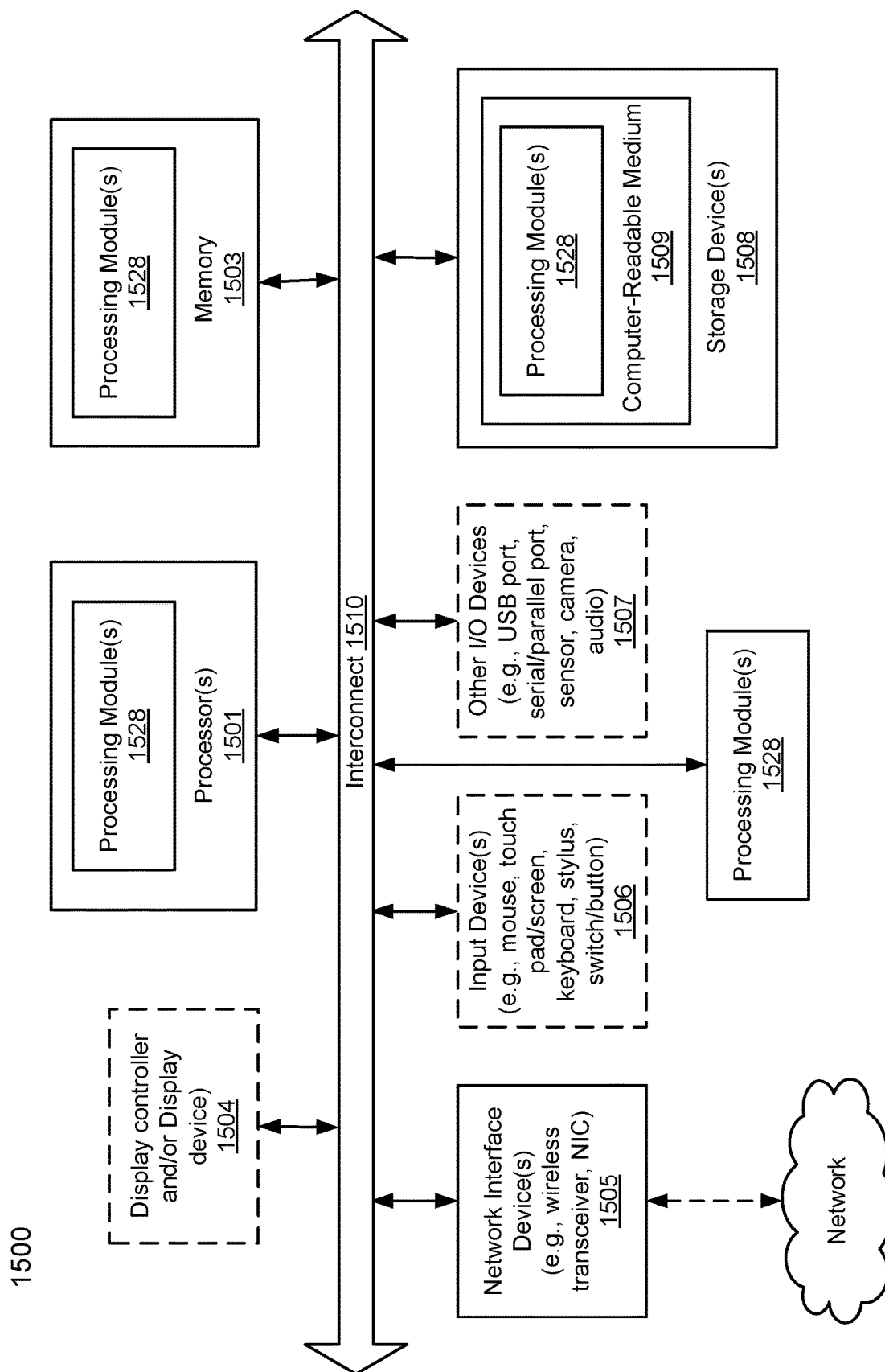
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, a client device or a server described above, such as, for example, clients 101-102, and server 104, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, gateway 106 or host server 104 of FIG. 1. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing data in a trusted environment, the method comprising:
    registering, at a gateway, an execution service as a trusted execution environment (TEE) worker, wherein the execution service is a service binary provided by a service provider for executing various requested services;
    in response to a request received at the gateway from a user device of a user over a network to process user data by the execution service, sanitizing the user data by scanning the user data for malicious code;
    selecting the TEE worker from a plurality of TEE workers, wherein the TEE worker has been authenticated by the gateway at time of registration and initiating an execution of the execution service by the selected TEE worker;
    receiving execution results from the selected TEE worker, including
       generating an identifier uniquely identifying the execution results;
       storing the identifier in a mapping table, wherein the mapping table comprises a plurality of identifiers mapping a plurality of execution results corresponding to each of a plurality of TEE workers; and
       sending the identifier to the user device for the user;
    in response to receiving the identifier, determining the execution results based on the identifier using the mapping table; and
    transmitting the execution results to the user device of the user over the network.

2. The method of claim 1, wherein the request is one of a plurality of requests received from a plurality of user devices associated with a plurality of users, and wherein each of the requests is processed by a respective one of a plurality of TEE workers.

3. The method of claim 1, wherein the gateway is attested by the user device to be trusted prior to the user device transmitting the request.

4. The method of claim 1, wherein registering the execution service comprises:
    in response to receiving a service binary and a description of the execution service from a service provider, verifying an integrity and authenticity of the service binary;
    scanning the service binary for malicious code; and registering the service binary as one of a plurality of TEE workers.

5. The method of claim 4, wherein the service provider attests the gateway to be a trusted prior to the service provider transmitting the service binary to the gateway.

6. The method of claim 1, further comprising obtaining a key to encrypt a client data from a key management server (KMS).

7. The method of claim 6, wherein obtaining the key comprises:
transmitting by the gateway a request to obtain the key to the KMS; and
receiving the key from the KMS, wherein the KMS generated a symmetric key or a key pair, and wherein the key is signed by the KMS for the gateway to verify authenticity of the key.

8. The method of claim 7, further comprising attesting, by the gateway, the KMS to be a trusted entity prior to the gateway transmitting the request, and wherein the KMS attests the gateway to be a trusted prior to the gateway transmitting the request.

9. The method of claim 1, wherein the gateway enforces authentication, authorization, audit, and account for network traffic for the gateway.

10. The method of claim 1, wherein the gateway provides reliable, replicated, redundant, and fault-tolerant (RAFT) services.

11. The method of claim 1, wherein the gateway is a non-bypassable gateway.

12. A non-transitory machine-readable medium having instructions stored therein, which when executed by a processor, cause the processor to perform operations, the operations comprising:
registering, at a gateway, an execution service as a trusted execution environment (TEE) worker, wherein the execution service is a service binary provided by a service provider for executing various requested services;
in response to a request received at the gateway from a user device of a user over a network to process user data by the execution service, sanitizing the user data by scanning the user data for malicious code;
selecting the TEE worker from a plurality of TEE workers, wherein the TEE worker has been authenticated by the gateway at time of registration and initiating an execution of the execution service by the selected TEE worker;
receiving execution results from the selected TEE worker, including
generating an identifier uniquely identifying the execution results;
storing the identifier in a mapping table, wherein the mapping table comprises a plurality of identifiers mapping a plurality of execution results corresponding to each of a plurality of TEE workers; and
sending the identifier to the user device for the user;
in response to receiving the identifier, determining the execution results based on the identifier using the mapping table; and
transmitting the execution results to the user device of the user over the network.

13. The non-transitory machine-readable medium of claim 12, wherein registering the execution service comprises:
in response to receiving a service binary and a description of the execution service from a service provider, verifying an integrity and authenticity of the service binary;
scanning the service binary for malicious code; and
registering the service binary as one of a plurality of TEE workers.

14. The non-transitory machine-readable medium of claim 12, wherein the operations further comprise obtaining a key to encrypt a client data from a key management server (KMS).

15. A data processing system, comprising:
a processor; and
a memory coupled to the processor to store instructions, which when executed by the processor, cause the processor to perform operations, the operations including:
registering, at a gateway, an execution service as a trusted execution environment (TEE) worker, wherein the execution service is a service binary provided by a service provider for executing various requested services;
in response to a request received at the gateway from a user device of a user over a network to process user data by the execution service, sanitizing the user data by scanning the user data for malicious code,
selecting the TEE worker from a plurality of TEE workers, wherein the TEE worker has been authenticated by the gateway at time of registration and initiating an execution of the execution service by the selected TEE worker,
receiving execution results from the selected TEE worker, including generating an identifier uniquely identifying the execution results;
storing the identifier in a mapping table, wherein the mapping table comprises a plurality of identifiers mapping a plurality of execution results corresponding to each of a plurality of TEE workers; and
sending the identifier to the user device for the user;
in response to receiving the identifier, determining the execution results based on the identifier using the mapping table, and
transmitting the execution results to the user device of the user over the network.

16. The system of claim 15, wherein registering the execution service comprises:
in response to receiving a service binary and a description of the execution service from a service provider, verifying an integrity and authenticity of the service binary;
scanning the service binary for malicious code; and
registering the service binary as one of a plurality of TEE workers.

17. The system of claim 15, wherein the operations further comprise obtaining a key to encrypt a client data from a key management server (KMS).

* * * * *